United States Patent [19]

Brammall

[11] Patent Number: 4,640,538
[45] Date of Patent: Feb. 3, 1987

[54] SECURITY SEAL
[75] Inventor: Terrence N. Brammall, Angola, Ind.
[73] Assignee: Trans-Guard Industries Inc., Angola, Ind.
[21] Appl. No.: 792,447
[22] Filed: Oct. 29, 1985
[51] Int. Cl.[4] .............................................. B65D 33/34
[52] U.S. Cl. .................................................... 292/323
[58] Field of Search ........... 292/239, 327, 252, 307 R, 292/DIG. 7, DIG. 10, 319, 320, 323; 24/136 A, 136 R, 115 G, 115 L, 127; 339/255 L, 273 S, 270 S, 248 S

[56] References Cited

U.S. PATENT DOCUMENTS

| | | | |
|---|---|---|---|
| 20,074 | 8/1936 | Stahl | 339/273 R X |
| 2,494,759 | 1/1950 | Hirschy | 24/136 A |
| 2,966,653 | 12/1960 | Jugle | 339/273 S X |
| 3,770,307 | 11/1973 | Van Gompel | 292/307 R |

Primary Examiner—Richard E. Moore
Attorney, Agent, or Firm—Robert E. Ross

[57] ABSTRACT

A security seal of the type which utilizes a stranded cable as a shackle. A seal body is provided with a pair of spaced apertures for receiving the end portions of a length of cable. A first cable end may be freely insertable into a shackle aperture, or may be staked therein so as to be non-removable, and the second cable end may be freely inserted into the second aperture, forming a cable loop at one end of the body forming a shackle. The second aperture leads to a cable channel which has a locking wheel and side walls retaining the wheel which cooperate to allow the cable to be inserted from said one end but lock the cable against retrograde movement after insertion.

To prevent the release of the cable by twisting the cable to cause the cable to back out of the opening by reason of the thread-like effect of the cable strands, the wheel is provided with recesses around the peripheral surface which simulate a thread having the same pitch as that of the individual filaments of the cable strands. The periphery of the wheel therefore meshes accurately with the cable filaments and prevents rotation of the cable in relation to the wheel, which is fixed against sideways rotation in the housing.

9 Claims, 4 Drawing Figures

SECURITY SEAL

BACKGROUND OF THE INVENTION

In certain types of security seals, a stranded cable is used as a shackle. The ends of the cable are inserted into spaced apertures in a housing which has internal means for allowing the cable to enter said apretures freely, but prevent reverse movement, said means often being a wheel or disc which, on reverse movement of the cable, is pulled into a narrower portion of the aperture, jamming the cable against further movement.

It has been found that such seals can often be defeated by twisting the cable, so that the grooves between the cable strands act as threads, allowing the cable to back out of the housing.

SUMMARY OF THE INVENTION

This invention provides a security seal of the type which utilizes a stranded cable as a shackle, in which a housing is provided with an aperture for receiving the cable in a manner such that it can be freely inserted into one end of the aperture, but is locked therein against reverse movement. A cable commonly used used as a shackle in such seals is formed of a plurality, such as seven, main strands, each main strand being made up of a plurality, such as 19, individual wire filaments. In such a cable, the individual filaments at the outer surface of the cable lie almost parallel to the axis of the cable. The locking means includes a wheel or disc which has grooves formed in the peripheral surface. In a preferred embodiment of the invention, the grooves are in the form of a thread, and for use with a cable as above described, the thread form will have 64 threads per inch. By actual measurement, an exact fit for said filaments would be 66 threads per inch, however a 64 thread per inch thread form is a standard thread used in industry, and is more economical to manufacture than the exact fit of 66 threads per inch. A cable with a different number of filaments in each strand would require a different thread form on the disc.

The engagement of the threads on the disc periphery with the filaments of a cable strand prevents the twisting of the cable in relation to the housing which could allow disengagement of the cable from the locking element.

DESCRIPTION OF THE ILLUSTRATED EMBODIMENT

Figure 1:
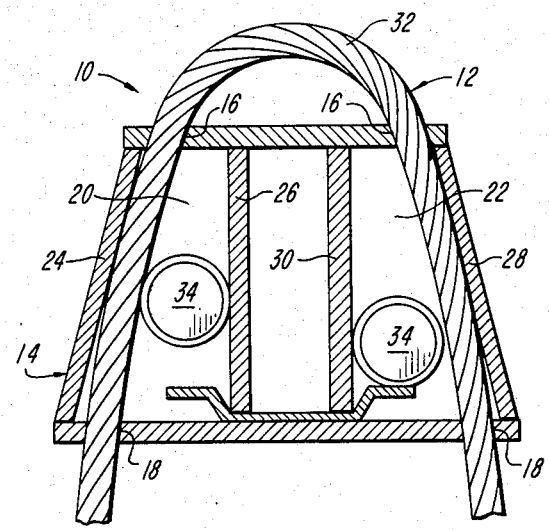
FIG. 1 is a plan view, partly broken away, of a seal housing embodying the features of the invention.
Figure 2:
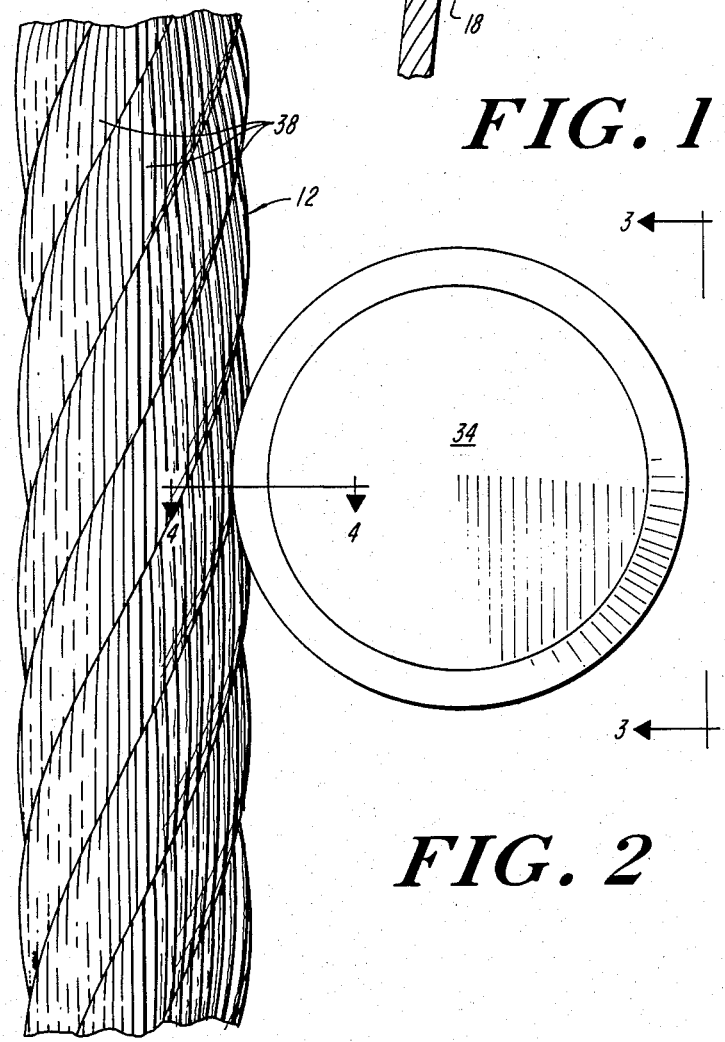
FIG. 2 is a an enlarged view of a portion of the seal assembly of FIG. 1, showing the engagement of a locking wheel with the cable.

Referring to the drawing, there is illustrated a security seal 10 which is designed for use with a stranded cable 12. The seal 10 may be similar in construction to the seal shown in my co-pending application Ser. No. 790,061 filed Oct. 22, 1985, and comprises a housing 14 having apertures 16 at the upper end and apertures 18 at the lower end, leading to a pair of internal channels 20 and 22. The channel 20 has sidewalls 24 and 26 which are inclined together from the bottom of the housing to the top, and the channel 22 has sidewalls 28 and 30 which are also inclined together from the bottom of the housing to the top. The walls of the channels are so arranged that the axes of the channels are also inclined together, so that the upper apertures 16 are closer together than the lower apertures 18, so that the shackle loop 32 formed at the top of the housing can be as small as possible.

Disposed in at least one channel is a locking member 34, which is in the form of a round disc having a thickness slightly less than the diameter of the cable 12 to be used with the housing, and having a periphery with a series of circumferential grooves 36 formed therein. In the preferred embodiment, the grooves are so spaced and have a pitch such that they will mesh with the cable filaments in a manner to be described.

Figure 3:
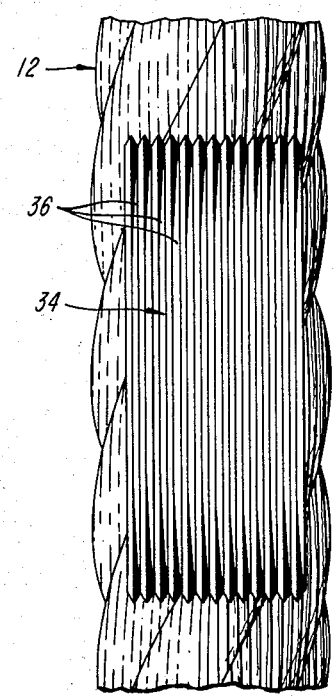
FIG. 3 is a view of FIG. 2 as seen from the right side.
Figure 4:
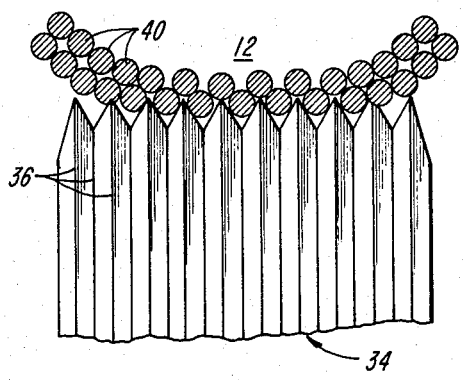
FIG. 4 is a view in section taken on line 4—4 of FIG. 2.

A typical cable that is used to form the shackle in such seals is formed of 7 strands twisted about each other, with each strand being made up of 19 individual wire filaments twisted about each other. The strands, in plan view, lie at an angle of about 30°0 to the axis of the cable, but the filaments of each strand, at the outer surface thereof, lie within a few degrees of being parallel to the axis of the cable, (See FIG. 3) and the dimensions of the filaments are such that there are about 64 filaments per inch on the surface of the strand.

Therefore the peripheral surface of the disc is provided with a series of grooves having substantially the same width as the filaments in the strand and spaced as close together as the filaments.

In a preferred embodiment of the invention this is accomplished by impressing a thread form onto the disc periphery which has substantially the same number of threads per inch as there are filaments per inch on the strand surface. To be absolutely accurate, this should be 66 threads per inch, however it has been found that a thread form of 64 threads per inch provides a satisfactory mesh with the surface of the filaments, and such thread form is more economical to manufacture, since 64 threads per inch is a standard thread pitch used in industry, and tooling for forming such threads is readily available commercially.

The locking disc operates generally in a manner previously known in the art, in that when a reverse pull is applied to a cable that extends into the housing, an initial slight rearward movement of the cable occurs, rolling the disc along a side wall of the channel, jamming the cable against the opposite sidewall. In the structure disclosed herein, the threaded surface of the disc meshes tightly with the filaments of the cable strand. Such meshing prevents the release of the cable from the seal body by attempts to rotate the cable in the housing to cause it to back out of the housing due to the thread effect of the cavity between the strands.

It is important that the material of which the disc is formed have a surface toughness which is sufficient to enable the threads to withstand a high rotational force applied to the cable without the treads being deformed or abraded to an extent such that rotation of the cable in relation to the disc becomes possible. For this purpose, the disc should be made of a high yield steel, a high carbon steel, or a steel that has been carburized or otherwise surface hardened. I have found that a cold-rolled 1060 steel, not heat treated, has sufficient hardness and toughness to enable the threads to resist deformation or abrasion by rotation of the cable.

Although in the illustrated embodiment the locking element is a disc, it will be understood that with other configurations of housing, the locking element may have other configurations.

Since certain other modifications to the illustrated embodoment of the invention will be apparent to one skilled in the art, it is intended that all matter contained herein be interpreted in an illustrative and not a limiting sense.

I claim:

1. A security seal of the type which utilizes a stranded cable as a shackle, said cable being of the type that includes spiral wound filaments on the exterior surface, said seal body having an internal channel for receiving the cable, and a cable locking element associated with said channel, said element being a disc having a series of parallel grooves in the peripheral surface, said surface being positioned for engagement with an inserted cable, said grooves having a configuration enabling it to mesh with the filaments on the external surface of the cable so as to prevent rotation of the cable in the housing.

2. A security seal as set out in claim 1 in which said disc is formed of a material having a surface hardness at least as great as that of a high yield steel or a carburized and hardened steel.

3. A security seal as set out in claim 1 in which said disc is formed of a 1060 steel.

4. A seal body as set out in claim 1 in which said grooves are formed by a spiral thread form.

5. A security seal of the type which utilizes a cable made up of twisted strands, each of which is made up of twisted individual filaments, said filaments on the outer surface of the cable extending nearly parallel to the axis of the cable, said seal comprising a body having an internal channel opening to opposite ends of the body, said channel being formed by side walls which are inclined toward each other so that the channel is tapered in width, and a cable locking disc in said channel movable between an unlocking position near the wider end of the channel and a locking position nearer the narrower end of the channel, said disc having a diameter in relation to the diameter of the cable to be inserted therein which is such that the cable can be freely inserted through the channel past the disc when the disc is in the unlocking position in the wider end of the channel, but locks the cable against reverse movement when the disc is in a narrower portion of the channel by forcing the cable against a channel side wall, said disc having parallel grooves formed on the peripheral surface thereof, said grooves being so spaced and oriented as to mesh with filaments on the outer surface of a strand when the disc moves to the locking position and forces the cable against the channel sidewall.

6. A seal body as set out in claim 5 in which said grooves are formed by a spiral thread form.

7. A seal assembly, comprising a seal body and a stranded cable made up of a plurality of strands twisted about each other, each strand being made up of a plurality of individual filaments twisted about each other, whereby the filaments at the outer surface of a strand lie in a direction nearly parallel to the cable axis, said seal body comprising an internal channel receiving the cable and a locking disc in said channel said disc having a peripheral surface positioned in frictional engagement with the outer disc peripheral surface of a strand, said surface having parallel grooves which conform to the configuration of the strand surface with which it is in engagement.

8. A cable assembly as set out in claim 7 in which said cable has an overall diameter of substantially 3/16 inch, and is made up of seven strands, each strand is made up of 19 individual filaments, and the surface of the locking element has a thread form having about 64 threads per inch, said threads on the portion of the locking element in engagement with the strand surface lying substantially parallel to the direction of the filaments.

9. A cable assembly as set out in claim 8 in which the locking element is a disc having a peripheral surface with the thread form thereon.

* * * * *